US007012823B2

(12) United States Patent
Gibbs

(10) Patent No.: US 7,012,823 B2
(45) Date of Patent: Mar. 14, 2006

(54) METHOD AND CONTROL SYSTEM EMPLOYING CONDUCTION MONITORS FOR DETECTING UNBALANCED CURRENT CONDITION OF ALTERNATING CURRENT PHASES

(75) Inventor: Irving A. Gibbs, Fletcher, NC (US)

(73) Assignee: Eaton Corporation, Cleveland, OH (US)

(*) Notice: Subject to any disclaimer, the term of this patent is extended or adjusted under 35 U.S.C. 154(b) by 9 days.

(21) Appl. No.: 10/898,846

(22) Filed: Jul. 26, 2004

(65) Prior Publication Data
US 2006/0018137 A1 Jan. 26, 2006

(51) Int. Cl.
H02M 5/42 (2006.01)
(52) U.S. Cl. .......................................... 363/87; 363/69
(58) Field of Classification Search .................. 363/69, 363/70, 85, 128, 87
See application file for complete search history.

(56) References Cited

U.S. PATENT DOCUMENTS

| 4,672,526 | A | * | 6/1987 | Mehnert et al. ............... 363/69 |
|---|---|---|---|---|
| 5,963,440 | A | | 10/1999 | Gibbs et al. |
| 5,963,441 | A | | 10/1999 | Gibbs et al. |
| 6,046,917 | A | | 4/2000 | Gibbs et al. |
| 6,208,120 | B1 | | 3/2001 | Gibbs |
| 6,232,751 | B1 | | 5/2001 | Farr et al. |
| 6,388,248 | B1 | | 5/2002 | Gibbs et al. |
| 6,396,247 | B1 | | 5/2002 | Gibbs et al. |
| 6,614,639 | B1 | | 9/2003 | Gibbs |
| 6,704,214 | B1 | | 3/2004 | Gibbs et al. |
| 6,724,643 | B1 | | 4/2004 | Gibbs |

OTHER PUBLICATIONS

Schweitzer Engineering Laboratories, Inc., "SEL-387E Current Differential and Voltage Relay", http://www.selinc.com/sel-387e.htm, 2004, 3 pp.
Basler Electric Company, http:/www.basler.com/, 2004, 2 pp.
Basler Electric Company, http:/www.basler.com/html/pcscds240.htm, 2004, 3 pp.

* cited by examiner

Primary Examiner—Shawn Riley
(74) Attorney, Agent, or Firm—Martin J. Moran

(57) ABSTRACT

A method controls and monitors a parallel array of a plurality of rectifier bridges each of which is adapted to convert a plurality of alternating current voltages of a plurality of alternating current phases to a voltage. The bridges include a plurality of segments each of which has an element. Each of the elements of one bridge is electrically interconnected in parallel with at least one corresponding element of at least another one of the bridges. A plurality of control signals are output to repetitively fire the elements. Conduction or non-conduction of the elements is sensed. The method determines, for the elements of the bridges, if any of the elements of one bridge and all of the at least one corresponding element of at least another one of the bridges, which are electrically interconnected in parallel, have the sensed non-conduction. An alarm signal is output responsive to the sensed non-conduction.

26 Claims, 6 Drawing Sheets

METHOD AND CONTROL SYSTEM EMPLOYING CONDUCTION MONITORS FOR DETECTING UNBALANCED CURRENT CONDITION OF ALTERNATING CURRENT PHASES

BACKGROUND OF THE INVENTION

1. Field of the Invention

This invention pertains generally to control systems and, more particularly, to such systems employing rectifiers, such as three-phase semiconductor controlled rectifier (SCR) bridges, for converting alternating current (AC) to direct current (DC). The invention also pertains to a method for controlling and monitoring a parallel array of rectifier bridges.

2. Background Information

Three-phase rectifier circuits are commonly employed to convert AC signals to DC signals. These circuits often use SCRs disposed in bridge segments, with typically one SCR for each polarity of each AC phase. Typically, a bridge firing control circuit controls the firing point for each rectifier in each AC cycle.

It is not uncommon for a plurality of SCR bridges to be operated in parallel with each of the corresponding bridge firing control circuits being controlled by a central firing control circuit. The central firing control circuit manages each of the bridge firing control circuits in order that the corresponding rectifiers in each of the parallel bridges conduct current at the same point in the AC waveform.

SCR bridges are commonly employed in an excitation control system to provide field excitation for a rotating electrical apparatus (e.g., large synchronous generators and motors, utility synchronous generators and motors, industrial synchronous motors and generators, synchronous generators and motors for naval or other shipping applications, synchronous generators and motors for oil well drilling rigs). For example, when the generator is on-line, generator field excitation is provided thereto.

As shown in FIG. 1, two controlled rectifier bridges 2,4 are connected in parallel. Each of the bridges 2,4 receives a multi-phase current input from a common AC source 6 (e.g., a motor generator, field transformer, power potential transformer (PPT)). See, for example, U.S. Pat. No. 6,232,751. A three-phase current input is employed in this example, although the invention is applicable to a wide range of phase counts. The several phases of input current, shown as 8A, 8B and 8C, are fed through contacts 10A, 10B and 10C, and 14A, 14B and 14C, respectively, to rectifying segments on the two respective bridges 2,4.

The exemplary bridges 2,4 each have six cells or segments, one for each polarity of each of the phase currents 8A,8B,8C, although the invention is applicable to a wide range of segment counts. For example, segment AP1 refers to the positive polarity of phase A in the first bridge 2, while segment AN1 refers to the negative polarity of phase A in that first bridge 2. The remaining segments of the first and second bridges 2,4 are noted in a similar manner by reference characters BP1,BN1,CP1,CN1 and AP2,AN2,BP2, BN2,CP2,CN2.

Each bridge segment includes its own element, such as the exemplary SCR 12, that has a firing input 15. When a suitable control signal is provided to one of the inputs 15, the corresponding SCR fires to, thereby, control current conduction (e.g., by starting or initiating current conduction) within the corresponding segment. Typically, the individual segments of each of the bridges 2,4 are fired every 60° of the AC cycle in the order: APn,CNn,BPn,ANn,CPn,BNn (where, for convenience of reference, APn, for example, refers to either AP1 or AP2). One of the SCRs 12 does not stop conducting until it is reversed biased. All of the positive rectifier output currents are summed together and the negative rectifier output currents are similarly summed and conveyed by corresponding positive and negative conductors 16,18 to a load (not shown).

An exemplary microprocessor-based control and monitoring circuit 20 has six control outputs 22, which are interconnected with the six firing inputs 15 of the SCRs 12, for outputting control signals to the segments AP1,BP1,CP1, AN1,BN1,CN1 to control current conduction within those segments, and various monitoring inputs 24,26. The six control outputs 22 include six digital logic control signals each of which controls current conduction within a corresponding one of the segments. The circuit 20 employs a firing code that has six bits. Each of the six bits is set when a corresponding segment is to fire (e.g., bit 0 for APn, bit 1 for BPn, bit 2 for CPn, bit 3 for ANn, bit 4 for BNn, and bit 5 for CNn). Each time a firing occurs, two cells are fired. Also, a cell is usually fired a second time in order that the second firing occurs in the next subsequent firing (e.g., by first firing APn and CNn with the firing code=$100001_2$, followed by firing CNn and BPn with the firing code=$100010_2$).

Monitors 28A,28B,28C provide conduction monitor signals to the inputs 26 for the three AC phases A,B,C. The monitors 28A,28B,28C monitor the respective phases A,B,C to provide corresponding conduction signals. The control and monitoring circuits 20 also input current signals from the shunts 30,32 and use that information to control the output of the respective bridges 2,4 through DC contact actuators (not shown).

The conduction monitors 28A,28B,28C typically provide not conducting, conducting positive, conducting negative, conducting negative and positive, and/or failed signals. For example, U.S. Pat. No. 5,963,441 discloses conduction monitors which output conduction monitor signals as four-state logic signals having a first state (e.g., $10_2$) representative of the positive polarity of AC input current; a second state (e.g., $01_2$) representative of the negative polarity of the AC input current; a third state (e.g., $00_2$) representative of about zero AC input current; and a fourth state (e.g., $11_2$) representative of failure of the monitor.

Additional or different hardware and/or software provides information that the conduction monitor detects both conducting negative and positive. For example, each of the conduction monitors 28A,28B,28C, as shown with the conduction monitor 28C, includes a forward (F) current sensor 28CP for the corresponding element CP1 and a reverse (R) current sensor 28CN for the corresponding element CN1. The conduction monitors 28A,28B,28C provide feedback to the control and monitoring circuit 20 (e.g., excitation control regulator) that the corresponding SCR bridge 2 is properly conducting.

In series with the contacts 10A,10B,10C,14A,14B,14C, or in place of such contacts, six fuses (not shown) may be employed. Also, for each of the bridges 2,4, a di/dt inductor (not shown) may be electrically connected in series with each of the SCRs 12.

If the SCR bridges 2,4 are employed in a generator excitation control system (not shown), then the generator (not shown) includes an output having three AC phases (not shown). A three-phase PPT transformer (not shown) includes three primary windings in a WYE-configuration and three corresponding secondary windings in a deltaconfiguration, although other transformer configurations may be employed. The primary windings are interconnected with the generator AC phases, while the corresponding secondary windings have three AC phases, each of which has a positive polarity and a negative polarity and a common frequency (e.g., 50 Hz, 60 Hz, 420 Hz), which form the common AC source 6. The PPT is normally connected to the terminals of the generator and, thus, the system is commonly referred to as a "terminal fed excitation system".

For static excitation systems, the PPT is electrically connected to a suitably reliable power source. In some systems, this is a station service source and in others it is the generator terminals. Most designs for PPTs will accommodate a certain amount of unbalanced operation. However, significant unbalance will saturate the PPT's core, thereby causing high operation temperatures. If this significant unbalance continues, then damage to the PPT may result.

U.S. Pat. No. 5,963,441 discloses an algorithm, which obtains individual SCR current measurements. The current is decremented when an SCR was fired twice, but was not conducting.

There are known separate hardware devices (e.g., current differential and voltage relays) that can be added to excitation equipment, in order to detect various unbalanced operating conditions. Although such devices can provide the desired protection, they are separate, add cost and must be mounted in the equipment.

Accordingly, there is room for improvement in control systems and methods for controlling and monitoring a parallel array of rectifier bridges.

SUMMARY OF THE INVENTION

These needs and others are met by the present invention, which employs, for example, existing excitation control hardware and an algorithm to detect unbalanced currents that occur as a result of blown excitation fuses, open excitation contacts and/or improper thyristor bridge operation.

In accordance with one aspect of the invention, a control system comprises: a firing control circuit outputting a plurality of firing commands; a plurality of rectifier bridges, each of the rectifier bridges adapted to convert a plurality of alternating current voltages of a plurality of alternating current phases to a voltage, each of the rectifier bridges comprising a plurality of segments, each of the segments having an element, each of the elements of one of the rectifier bridges being electrically interconnected in parallel with at least one corresponding element of at least another one of the rectifier bridges; a plurality of conduction monitors for each of the rectifier bridges, each of the conduction monitors adapted to sense conduction or non-conduction of a corresponding one of the elements; a bridge control circuit for each of the rectifier bridges, each of the bridge control circuits adapted to input a corresponding one of the firing commands, to output a plurality of control signals responsive to the corresponding one of the firing commands in order to repetitively fire at least some of the elements of a corresponding one of the rectifier bridges, and to input the sensed conduction or non-conduction of corresponding ones of the elements of the corresponding one of the rectifier bridges; and a communication channel adapted to communicate the sensed conduction or non-conduction of the elements of the rectifier bridges from the bridge control circuits to the firing control circuit, and to communicate the firing commands from the firing control circuit to the bridge control circuits, wherein the firing control circuit includes a routine adapted to determine, for the elements of the rectifier bridges, if any of the elements of one of the rectifier bridges and all of the at least one corresponding element of at least another one of the rectifier bridges, which are electrically interconnected in parallel, have the sensed non-conduction and to responsively output a signal.

The signal output by the routine may be an alarm signal adapted to indicate an unbalanced current condition of the alternating current phases.

Each of the rectifier bridges may convert three of the alternating current voltages of three of the alternating current phases to the voltage. Each of the rectifier bridges may comprise six of the segments and six of the elements. The conduction monitors may include three forward current sensors for three of the six elements and three reverse current sensors for another three of the six elements.

The routine may be a first routine, and each of the bridge control circuits may comprise a processor and a second routine adapted to input the sensed conduction or non-conduction of the three forward current sensors and the sensed conduction or non-conduction of the three reverse current sensors for the corresponding one of the rectifier bridges.

The second routine may be adapted to periodically input the sensed conduction or non-conduction of the three forward and three reverse current sensors. The second routine may be adapted to decrement a value responsive to the sensed non-conduction of a corresponding one of the elements of the corresponding one of the rectifier bridges, and to determine if the value is less than zero and responsively set an alarm for the corresponding one of the elements being open.

As another aspect of the invention, a method controls and monitors a parallel array of a plurality of rectifier bridges. Each of the rectifier bridges may be adapted to convert a plurality of alternating current voltages of a plurality of alternating current phases to a voltage, each of the rectifier bridges comprising a plurality of segments, each of the segments having an element, each of the elements of one of the rectifier bridges being electrically interconnected in parallel with at least one corresponding element of at least another one of the rectifier bridges. The method comprises: outputting a plurality of control signals to repetitively fire the elements; sensing conduction or non-conduction of the elements; determining, for the elements of the rectifier bridges, if any of the elements of one of the rectifier bridges and all of the at least one corresponding element of at least another one of the rectifier bridges, which are electrically interconnected in parallel, have the sensed non-conduction; and outputting a signal responsive to the sensed non-conduction.

The method may include decrementing a value responsive to the sensed non-conduction of a corresponding one of the elements of the corresponding one of the rectifier bridges; and determining if the value is less than zero and responsively setting an alarm for the corresponding one of the elements being open.

The method may include sensing non-conduction of one of the elements; decrementing a value; and determining if the value is less than zero and responsively setting an alarm for the one of the elements being open.

The method may include sensing conduction of one of the elements; employing the one of the elements to convert a first one of the alternating current voltages of a first one of the alternating current phases of a first polarity to the voltage; employing another one of the elements to convert the first one of the alternating current voltages of the first one of the alternating current phases of an opposite second polarity to the voltage; sensing non-conduction of the another one of the elements; increasing a value by a first predetermined number; and determining if the value is greater than a second predetermined number and responsively clearing an alarm for the one of the elements being open. The method may further include limiting the value to the second predetermined number responsive to the determining if the value is greater than a second predetermined number.

The method may include sensing conduction of one of the elements; employing the one of the elements to convert a first one of the alternating current voltages of a first one of the alternating current phases of a first polarity to the voltage; employing another one of the elements to convert the first one of the alternating current voltages of the first one of the alternating current phases of an opposite second polarity to the voltage; sensing conduction of the another one of the elements; increasing a value by a first predetermined number; and determining if the value is greater than a second predetermined number and responsively setting an alarm for improper sensing of conduction of the one of the elements and the another one of the elements.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The present invention is described in association with an excitation control system, although the invention is applicable to a wide range of control systems and methods for controlling and monitoring parallel arrays of rectifiers.

Figure 1:
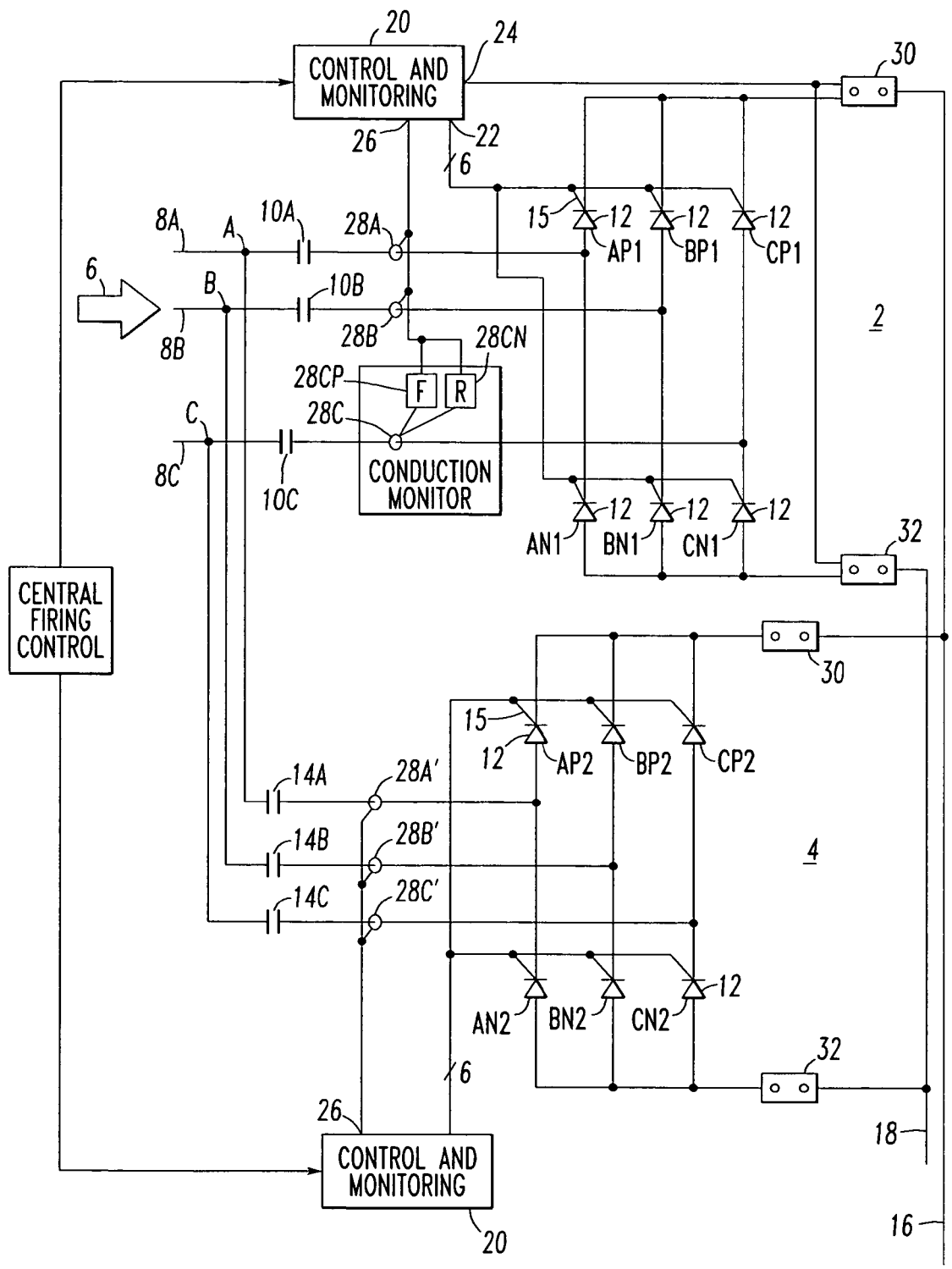
FIG. 1 is a circuit block diagram of two, three-phase, SCR bridges which are fed from a common three-phase source and which are connected in parallel to provide an additive current output.
Figure 2A:
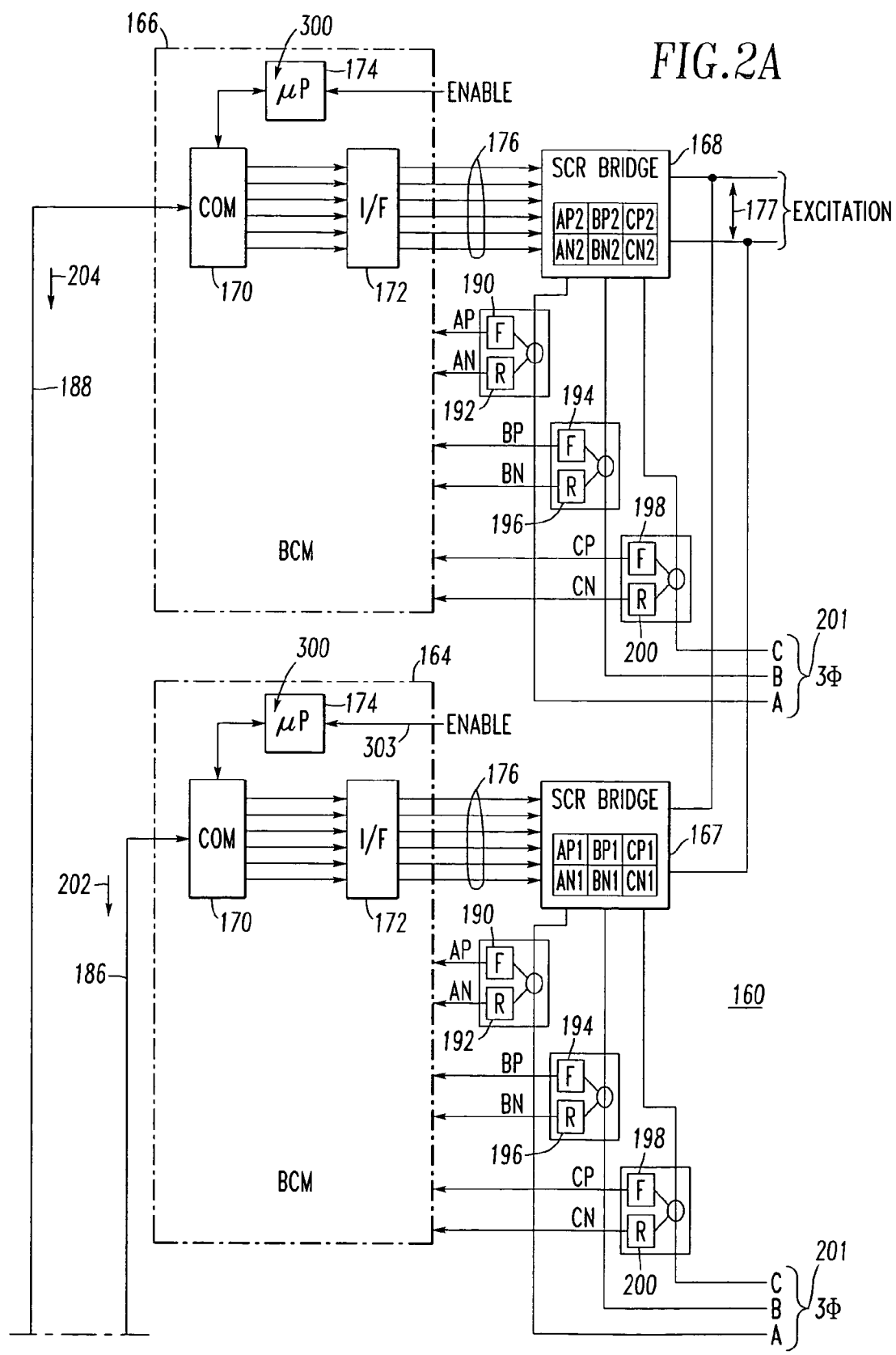
FIGS. 2A–2B form a block diagram of a firing control interface module (FCIM) and two bridge control modules (BCMs) in accordance with the present invention.
Figure 2B:
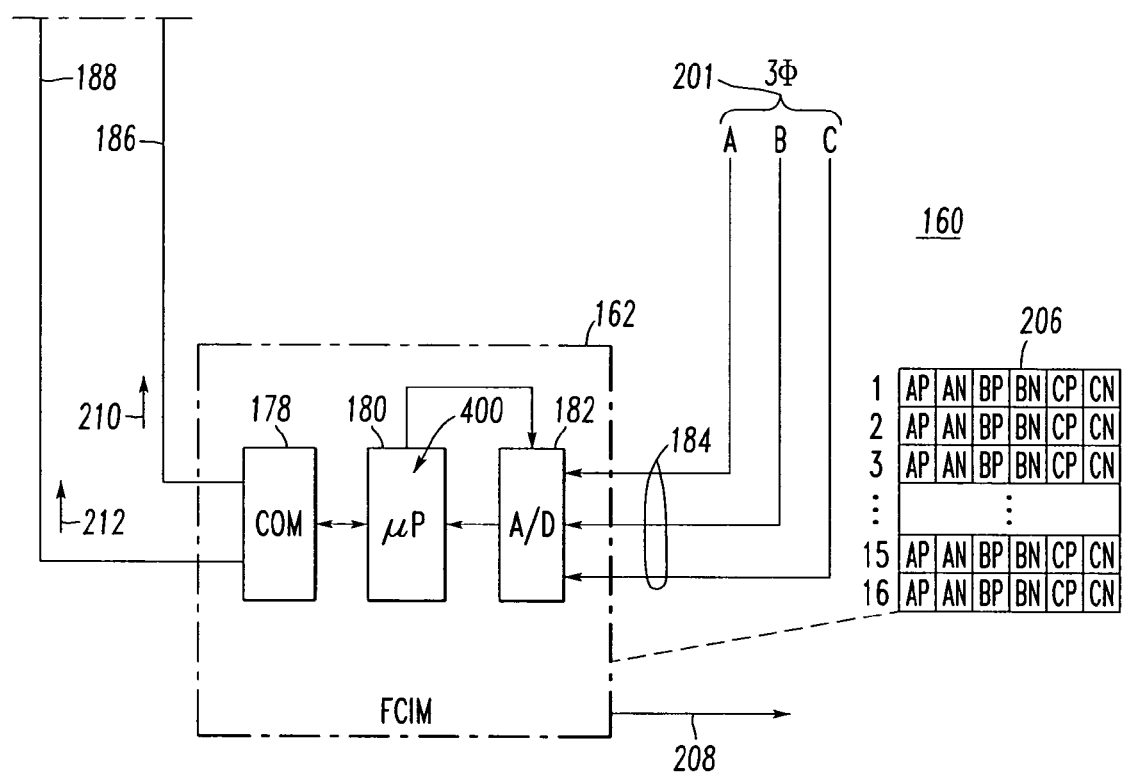

Referring to FIGS. 2A–2B, a control system 160 includes a firing control interface module (FCIM) 162 and two bridge control modules (BCMs) 164,166 for respective SCR bridges 167,168, which are similar to the bridges 2,4 of FIG. 1. An example of a control system is disclosed in U.S. Pat. No. 6,046,917, which is hereby incorporated by reference herein. Each of the BCMs 164,166 includes a suitable communications interface (COM) 170, an interface (I/F) 172 to the corresponding bridge 167,168, and a suitable microprocessor ($\mu$P) 174. The COM 170 and $\mu$P 174 cooperate to send six exemplary firing pulses 176 to all of the segments in the corresponding bridge 167,168. Similar to the bridges 2,4 of FIG. 1, the SCR bridges 167,168 output a rectified voltage 177.

The SCR bridge 167, for example, has its own BCM 164, which communicates with the FCIM 162. The FCIM 162 monitors the input voltage to the bridges 167,168 and also communicates with the other BCM 166. Although two exemplary bridges 167,168 are shown, three or more parallel bridges may employed. It will be appreciated that the FCIM 162 controls and communicates with additional BCMs (not shown) in a similar manner.

The FCIM 162 includes a suitable communications interface (COM) 178, a suitable microprocessor ($\mu$P) 180, and an A/D converter 182, which samples the voltages of the three phases 184 through a suitable interface (not shown). The COM 178 of the FCIM 162 communicates with the COMs 170 of the BCMs 164,166 through suitable communication channels 186,188, respectively. In this manner, the FCIM 162 controls the BCMs 164,166 through the corresponding communication channels. In a preferred mode of operation with the plural bridges 167,168, the FCIM 162 sends synchronized control signals to each of the BCMs 164,166. In turn, the BCMs 164,166 repetitively send one or more synchronized firing pulses 176 to all of the corresponding SCRs (not shown) in the corresponding bridges 167,168.

Figure 3:
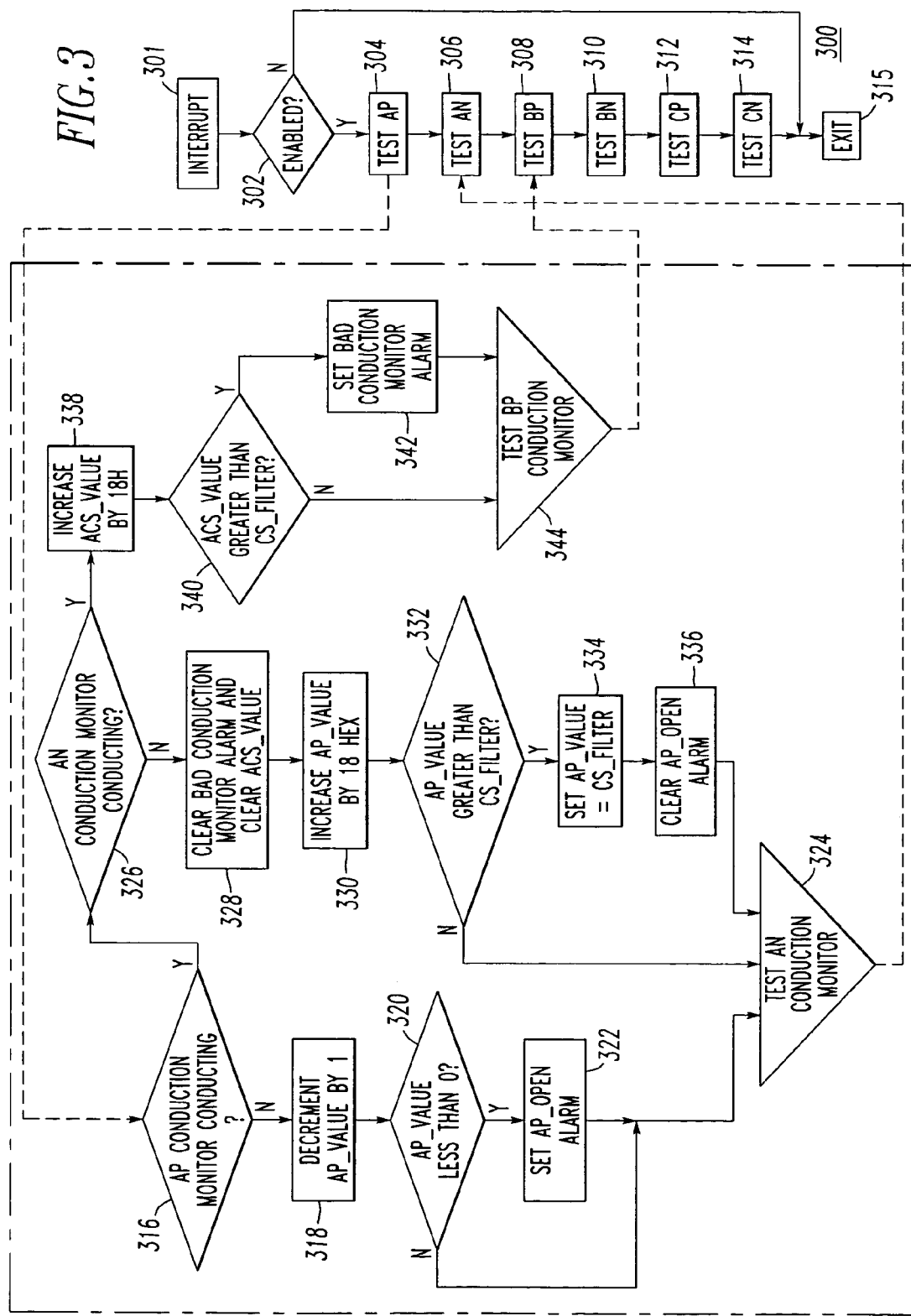
FIG. 3 is a flowchart of logic employed by the BCMs of FIG. 2A to determine the conduction state of the six SCRs of the corresponding SCR bridge.
Figure 4:
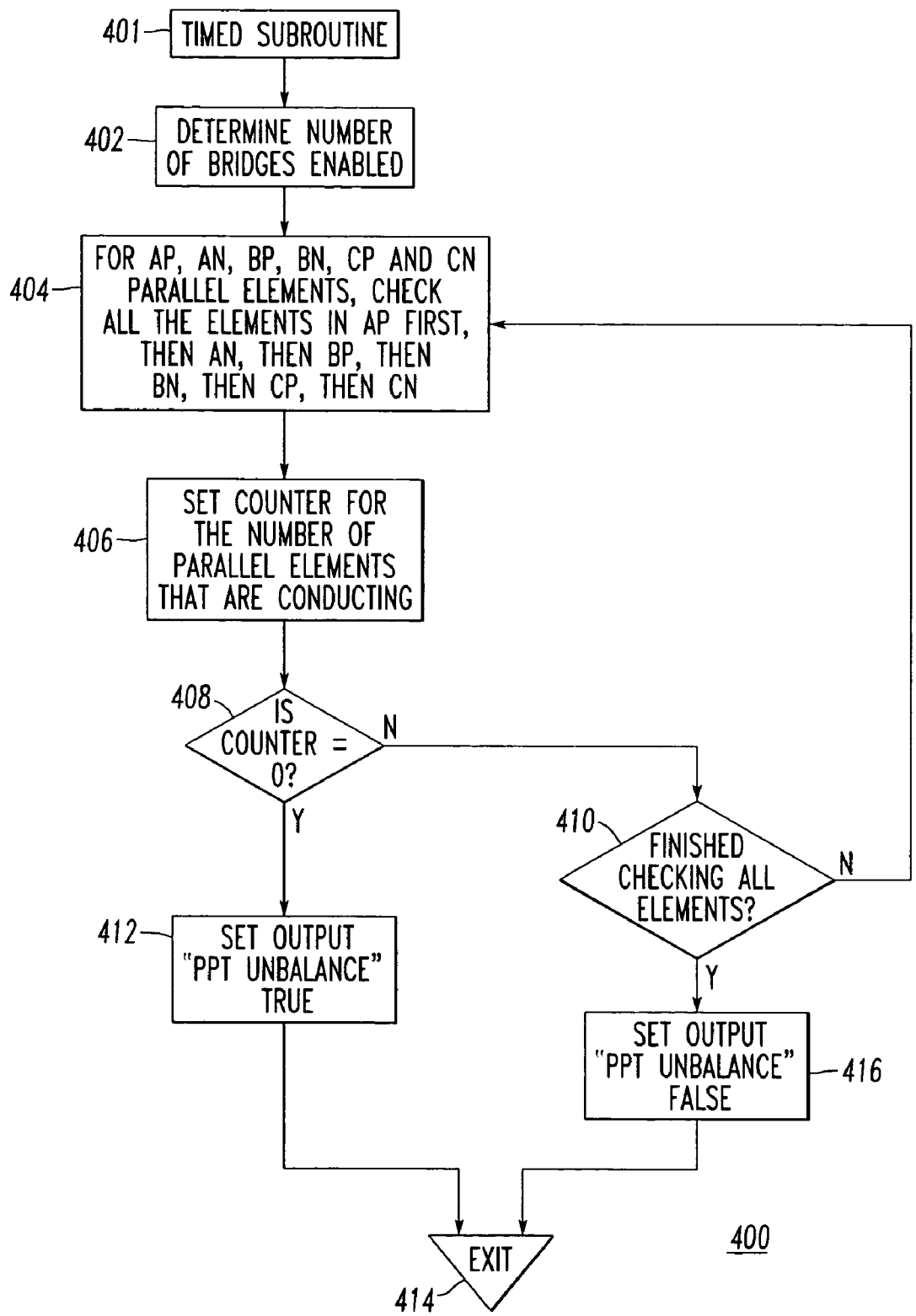
FIG. 4 is a flowchart of logic employed by the FCIM of FIG. 2B to determine an unbalance condition based upon the SCR conduction states from the BCMs.

FIGS. 3 and 4 show a BCM algorithm or conduction sensor logic (CSL) block 300 (e.g., executing every about 521 $\mu$s; executing about 32 times per line cycle; periodically repeating execution after a suitable time period), and an FCIM algorithm 400 (e.g., executing every about 100 to about 200 ms; periodically repeating execution after a suitable time period), respectively, in accordance with the present invention. When a contact (e.g., 10A of FIG. 1) or fuse (not shown) opens, or when a thyristor gate lead (e.g., firing input 15 of FIG. 1) is improperly connected, or if for some other reason a thyristor does not conduct current, then the BCM algorithm 300 detects the loss of conduction in the corresponding one of the bridges, such as 167,168 of FIG. 2A.

As shown with the BCM 166 of FIG. 2A, the BCM algorithm 300 is adapted to input the sensed conduction or non-conduction of three forward (F) current sensors 190, 194,198 and the sensed conduction or non-conduction of three reverse (R) current sensors 192,196,200 for the corresponding one of the rectifier bridges, such as 168. When there is more than one bridge that is operating in parallel, such as bridges 167,168, then the loss of conduction in one bridge, such as 167, will not unbalance the AC source 201 (e.g., a PPT (not shown)), since the other parallel branches (e.g., through bridge 168) provide current paths. However, if all of the parallel paths in a leg (e.g., AP1 and AP2 of FIG. 2A) are open, then there is no longer a path for the current and the AC source 201 will be unbalanced.

As shown with the FCIM 162 of FIG. 2B, the FCIM algorithm 400 is adapted to determine, for the elements of the rectifier bridges 167,168, if any of the elements of one of those rectifier bridges and all of the one or more corresponding elements of the one or more other rectifier bridges, which are electrically interconnected in parallel, have the sensed non-conduction. If so, then the signal 208 is responsively output. The condition of no current in any of the six parallel leg branches (e.g., one leg branch is formed by AP1 and AP2) is detected by the FCIM algorithm 400 and is available for use from the signal 208, for example, as an alarm signal and/or a trip signal, in order to indicate the severe unbalanced current condition.

As shown in FIG. 2B, the FCIM 162 outputs a plurality of firing commands 210,212 to the respective BCMs 164, 166. The BCMs 164,166 input the respective commands 210,212 and responsively output the control signals 176, in order to repetitively fire at least some of the elements of the respective bridges 167,168. As will be discussed in greater detail, below, messages 202,204 from the respective BCMs 164,166 to the FCIM 162 include the sensed conduction or non-conduction information of corresponding elements of the respective bridges 167,168.

The communication channels 186,188 are adapted to periodically communicate through the messages 202,204 the sensed conduction or non-conduction of the elements of the rectifier bridges 167,168 from the respective BCMs 164,166 to the FCIM 162, and to communicate the firing commands 210,212 from the FCIM 162 to the respective BCMs 164, 166, Although a communication channel, such as 186,188, is shown for each of the BCMs 164,166, it will be appreciated that a single communication channel (e.g., any suitable communication network) (not shown) may be employed.

Referring again to FIG. 3, execution begins responsive to a periodic interrupt 301. Next, step 302 tests an enable input 303 (FIG. 2A) of the BCM 164, which can be set false, in order to disable conduction monitor alarms until a suitable DC current threshold has been exceeded or if the corresponding BCM, such as 164, is not running. For example, the FCIM 162 may monitor the total DC output current from the rectifier bridges 167,168 and set the BCM enable inputs 303 (e.g., through the communication channels 186,188) when that current exceeds a predetermined value. Conversely, a true value for input 303 allows the conduction monitor checks at even steps 304–314 to execute. The even steps 304–314 show the sequence that the conduction monitor values are tested. As shown in FIG. 2A with the BCM 166, the phase A conduction monitor includes the forward sensor AP 190 and the reverse sensor AN 192. The phase B conduction monitor includes the forward sensor BP 194 and the reverse sensor BN 196. The phase C conduction monitor includes the forward sensor CP 198 and the reverse sensor CN 200. Even steps 304–314 respectively test the even sensors 190–200. After step 314, the BCM algorithm 300 exits at 315. Step 301 is preferably repeated at a suitable periodic interval (e.g., 521 µs).

FIG. 3 also shows the details of the step 304 for forward sensor AP 190. Those skilled in the art will appreciate that the other even steps 306–314 for the respective even sensors 192–200 follow in a similar manner. For example, for the test of the AN sensor 192, the "AP" in step 316 would be "AN," and the "AN" in step 326 would be "AP". Also, for the test of the BP sensor 194, the various instances of "AP" would be "BP," the various instances of "AN" would be "BN," the "BP" in step 344 would be "CP," and the "ACS_Value" in step 340 would be "BCS_Value".

First, at 316, it is determined if the forward sensor AP 190 is conducting (e.g., the current in the AP2 element of the bridge 168 is greater than a predetermined threshold, such as, for example, 30 A). If not, then, at 318, a value AP_Value is decremented. Next, at 320, it is determined if AP_Value is negative. If so, then, at 322, an AP_Open alarm is set. After either 320 or 322, execution resumes at 324, which proceeds to test the reverse sensor AN 192 at 306.

Otherwise, if the forward sensor AP 190 was conducting at 316, then, at 326, it is determined if the reverse sensor AN 192 is conducting (e.g., the current in the AN2 element of the bridge 168 is greater than a predetermined threshold, such as, sensing of phase A and the ACS_Value are cleared. Next, at 330, the AP_Value is increased by a suitable constant (e.g., without limitation, 18H). Then, at 332, it is determined if the AP_Value is greater than a predetermined CS_Filter value (e.g., without limitation, about 500 to about 10,000). If so, then, the AP_Value is limited to the value of CS_Filter at 334. Next, at 336, the AP_Open Alarm of step 322 is cleared. Then, after either 332 or 336, execution resumes at 324, which proceeds to test the reverse sensor AN 192 at 306.

Otherwise, if the reverse sensor AN 192 was conducting at 326, then, at 338, an ACS_value is increased by a suitable constant (e.g., 18H). Next, at 340, it is determined if the ACS_Value is greater than CS_Filter. If so, then at 342, the conduction monitor alarm for improper sensing of phase A (i.e., for both the forward sensor AP 190 and the reverse sensor AN 192 of phase A) is set. Finally, after either 340 or 342, execution resumes at 344, which proceeds to test the forward sensor BP 194 at 308.

In the BCM algorithm 300 of FIG. 3, the conduction monitor sensors 190,192,194,196,198,200 are polled on an interrupt basis (e.g., periodically based upon a timer interrupt at about 521 µs), in order to determine if such conduction monitor sensors are conducting. The conduction monitor status is checked sequentially for the bridge elements (e.g., AP2,AN2,BP2,BN2,CP2,CN2 of bridge 168). After a given time interval of non-conduction in a particular SCR, the appropriate bit (e.g., AP_Open alarm) is set, for example, at 322, for element AP2.

In any one of the BCMs, such as 166, the BCM algorithm 300 is employed to monitor the six even sensors 190–200 of the three line conduction monitors and to determine when the corresponding bridge elements are actually conducting. For example, the positive and negative sensors 190,192 of the phase A conduction monitor are guaranteed to turn on at about 30 A, although they typically turn on at about 15 A. This means that the bridge elements may conduct at relatively low levels. Because those conduction monitor sensors do not detect the relatively lower currents (e.g., up to about 15 A to about 30 A), a false indication (or alarm) of an open element could, in theory, be given. However, this should typically not be an issue, since load field currents for utility generators are typically much larger than 30 A.

The Conduction Sensor Filter (CS_Filter) of step 332 of FIG. 3 allows some time delay to occur before an open bridge element indication is given. For example, CS_Filter is a positive number less than 32767 (i.e., less than 7FFFH), greater than 40 at 60 Hz, and about 240 at 10 Hz, in order to avoid the possibility of false alarms. Typically, a setting of about 500 (e.g., which corresponds to about 250 ms at a 521 us interrupt rate) or a suitable greater value is employed. Increasing that number increases the time delay.

During each periodic execution, the BCM algorithm 300 tests the six even sensors 190–200 of the three line conduction monitors and determines their status. If a conduction monitor sensor is not conducting, for CS_Filter consecutive times, as determined at steps 334, 316, 318, and 320, then step 322 sets the appropriate open alarm bit.

If the BCM algorithm 300 determines that both the positive and negative sensors (e.g., 190,192 of the phase A conduction monitor) are simultaneously conducting, then it will set a failed conduction monitor alarm at step 342. This alarm clears (e.g., at step 328) when proper conduction (e.g., the positive sensor 190 conducts when the negative sensor 192 does not conduct) occurs.

As shown in FIG. 2B, the FCIM 162 preferably periodically receives information (e.g., about every 100 ms for one BCM; about every 1.6 s for 16 BCMs) for each of the bridges 167,168 in the system 160 regarding the conduction monitor status. For example, the messages 202,204 from the BCMs 164,166 include that information. For example, the message 204 includes the six alarm bits (from step 322 of FIG. 3) for sensor AP representative of the six even sensors 190–200 (AP,AN,BP,BN,CP,CN).

FIG. 4 shows the FCIM algorithm 400 that employs the information from the messages 202,204 of the various respective BCMs 164,166 of FIG. 2A, in order to create a PPT unbalance alarm (e.g., per user selection, this may be an alarm and/or may trip a generator (not shown)). The FCIM 162 of FIG. 2B may control up to, for example, 16 parallel BCMs, such as 164,166. For the purpose of detecting conduction or non-conduction of a particular bridge element (e.g., AP2,AN2,BP2,BN2,CP2,CN2 of FIG. 2A), the FCIM algorithm 400 sets a bit in memory 206 (FIG. 2B) of the processor 180 if a corresponding conduction monitor sensor is not conducting. If conduction occurs, then the corresponding bit in the memory 206 is cleared. The memory 206 is allocated as a conduction bit for each bridge element, up to 16 bridges (e.g., up to 96 bits at 6 bits per 16 bridges).

First, the FCIM algorithm 400 starts a timed subroutine 401 responsive to a periodic timer (not shown). Next, at 402, the count of bridges (e.g., 167,168 of FIG. 2A) that are enabled is determined. The count may be determined, for example, by a configuration parameter (not shown) of the FCIM 162. Next, at 404, for the parallel bridge elements of the bridges 167,168, all of the elements for AP are first checked, followed by AN, then BP, then BN, then CP and then CN. In this example, if 16 bridges were enabled, then step 404 first considers all 16 of the AP bits in the memory 206. Then, at 406, a counter is set for the count of parallel bridge elements that are conducting. Next, at 408, it is determined if the counter is zero. If not, then, at 410, it is determined if all bridge elements have been considered. In this example, only the AP elements have been considered, and step 404 is repeated for the AN elements. This repeats steps 404,406,408,410 five additional times for the AN,BP, BN,CP,CN elements. At any time, if step 408 determines that the counter is zero, which indicates that all of the corresponding bridge elements (e.g., AN) in the parallel bridges are non-conducting, then an unbalance condition is indicated. If so, then step 412 outputs the "PPT Unbalance" signal 208 (FIG. 2B). This signal 208 may be output by the FCIM algorithm 400 as an alarm signal adapted to indicate an unbalanced current condition of the three alternating current phases of the AC source 201 (FIGS. 2A–2B). After 412, the algorithm 400 exits at 414. Otherwise, if step 410 determines that all elements have been considered, then at 416, the "PPT Unbalance" signal 208 (FIG. 2B) is reset. Again, after step 416, the algorithm 400 exits at 414.

Figure 5:
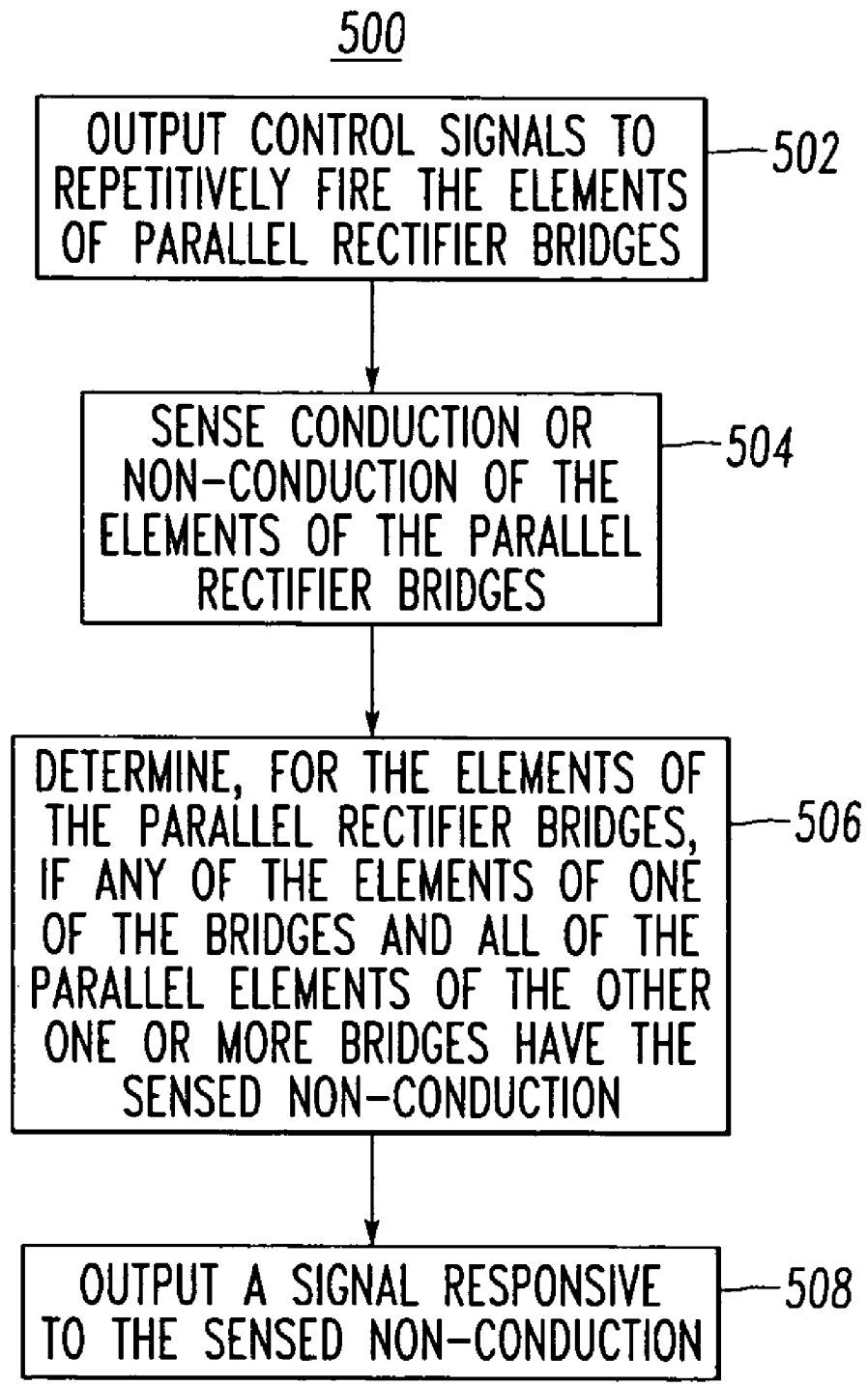
FIG. 5 is a block diagram of a procedure in accordance with an embodiment of the invention.

FIG. 5 shows a procedure 500 for controlling and monitoring a parallel array of a plurality of rectifier bridges, such as 167,168 of FIG. 2A. First, at 502, a plurality of control signals, such as the firing commands 210,212, are output to repetitively fire the bridge elements (e.g., AP2,AN2,BP2, BN2,CP2,CN2) of the bridges 167,168, Next, at 504, the conduction or non-conduction of those bridge elements is sensed by employing the even conduction monitor sensors 190–200. Then, at 506, it is determined, for the elements of the rectifier bridges 167,168, if any of the elements (e.g., CP2) of one of the rectifier bridges (e.g., 168) and all of the at least one corresponding element (e.g., CP1) of at least another one of the rectifier bridges (e.g., 167), which are electrically interconnected in parallel, have the sensed non-conduction. Finally, at 508, the signal 208 (FIG. 2B) is output responsive to the sensed non-conduction.

Although the FCIM 162 and BCMs 164,166 employ processor based circuits, it will be appreciated that a combination of one or more of analog, digital and/or processor-based circuits may be employed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A control system comprising:
    a firing control circuit outputting a plurality of firing commands;
    a plurality of rectifier bridges, each of said rectifier bridges adapted to convert a plurality of alternating current voltages of a plurality of alternating current phases to a voltage, each of said rectifier bridges comprising a plurality of segments, each of said segments having an element, each of the elements of one of said rectifier bridges being electrically interconnected in parallel with at least one corresponding element of at least another one of said rectifier bridges;
    a plurality of conduction monitors for each of said rectifier bridges, each of said conduction monitors adapted to sense conduction or non-conduction of a corresponding one of said elements;
    a bridge control circuit for each of said rectifier bridges, each of said bridge control circuits adapted to input a corresponding one of the firing commands, to output a plurality of control signals responsive to said corresponding one of the firing commands in order to repetitively fire at least some of said elements of a corresponding one of said rectifier bridges, and to input the sensed conduction or non-conduction of corresponding ones of said elements of the corresponding one of said rectifier bridges; and
    a communication channel adapted to communicate the sensed conduction or non-conduction of the elements of said rectifier bridges from said bridge control circuits to said firing control circuit, and to communicate the firing commands from said firing control circuit to said bridge control circuits,
    wherein said firing control circuit includes a routine adapted to determine, for the elements of said rectifier bridges, if any of said elements of one of said rectifier bridges and all of said at least one corresponding element of at least another one of said rectifier bridges, which are electrically interconnected in parallel, have the sensed non-conduction and to responsively output a signal.

2. The control system of claim 1 wherein the signal output by said routine is an alarm signal adapted to indicate an unbalanced current condition of said alternating current phases.

3. The control system of claim 1 wherein said elements are semiconductor devices.

4. The control system of claim 3 wherein said semiconductor devices are thyristors or SCRs.

5. The control system of claim 1 wherein each of said rectifier bridges converts three of said alternating current voltages of three of said alternating current phases to said voltage; wherein each of said rectifier bridges comprising six of said segments and six of said elements; and wherein said conduction monitors include three forward current sensors for three of said six elements and three reverse current sensors for another three of said six elements.

6. The control system of claim 5 wherein said routine is a first routine; wherein each of said bridge control circuits comprises a processor and a second routine adapted to input the sensed conduction or non-conduction of said three forward current sensors and the sensed conduction or non-conduction of said three reverse current sensors for the corresponding one of said rectifier bridges.

7. The control system of claim 6 wherein said second routine is adapted to periodically input the sensed conduction or non-conduction of said three forward and three reverse current sensors.

8. The control system of claim 6 wherein said second routine is adapted to decrement a value responsive to the sensed non-conduction of a corresponding one of said elements of the corresponding one of said rectifier bridges, and to determine if said value is less than zero and responsively set an alarm for the corresponding one of said elements being open.

9. The control system of claim 1 wherein said communication channel is adapted to periodically communicate the input sensed conduction or non-conduction of the elements of said rectifier bridges from said bridge control circuits to said firing control circuit for each of said bridge control circuits.

10. The control system of claim 1 wherein the routine of said firing control circuit is adapted to periodically execute.

11. A method for controlling and monitoring a parallel array of a plurality of rectifier bridges, each of said rectifier bridges adapted to convert a plurality of alternating current voltages of a plurality of alternating current phases to a voltage, each of said rectifier bridges comprising a plurality of segments, each of said segments having an element, each of the elements of one of said rectifier bridges being electrically interconnected in parallel with at least one corresponding element of at least another one of said rectifier bridges, said method comprising:
outputting a plurality of control signals to repetitively fire said elements;
sensing conduction or non-conduction of said elements;
determining, for the elements of said rectifier bridges, if any of said elements of one of said rectifier bridges and all of said at least one corresponding element of at least another one of said rectifier bridges, which are electrically interconnected in parallel, have the sensed non-conduction; and
outputting a signal responsive to said sensed non-conduction.

12. The method of claim 11 further comprising
employing as said signal an alarm signal adapted to indicate an unbalanced current condition of said alternating current phases.

13. The method of claim 11 further comprising
employing semiconductor devices as said elements.

14. The method of claim 13 further comprising
employing thyristors or SCRs as said semiconductor devices.

15. The method of claim 11 further comprising
converting three of said alternating current voltages of three of said alternating current phases to said voltage;
employing six of said segments and six of said elements;
employing three conduction monitors including three forward current sensors for three of said six elements and three reverse current sensors for three of said six elements; and
sensing conduction or non-conduction with said three forward and three reverse current sensors.

16. The method of claim 15 further comprising
employing a processor and a routine to input the sensed conduction or non-conduction of said three forward current sensors and the sensed conduction or non-conduction of said three reverse current sensors.

17. The method of claim 16 further comprising
periodically inputting the sensed conduction or non-conduction of said three forward and three reverse current sensors.

18. The method of claim 1 further comprising
decrementing a value responsive to the sensed non-conduction of a corresponding one of said elements of the corresponding one of said rectifier bridges; and
determining if said value is less than zero and responsively setting an alarm for the corresponding one of said elements being open.

19. The method of claim 11 further comprising
periodically communicating said input sensed conduction or non-conduction of the elements of said rectifier bridges from a plurality of bridge control circuits to a firing control circuit for each of the bridge control circuits.

20. The method of claim 11 further comprising
periodically repeating said determining.

21. The method of claim 11 further comprising
sensing non-conduction of one of said elements;
decrementing a value; and
determining if said value is less than zero and responsively setting an alarm for said one of said elements being open.

22. The method of claim 11 further comprising
sensing conduction of one of said elements;
employing said one of said elements to convert a first one of said alternating current voltages of a first one of said alternating current phases of a first polarity to said voltage;
employing another one of said elements to convert said first one of said alternating current voltages of said first one of said alternating current phases of an opposite second polarity to said voltage;
sensing non-conduction of said another one of said elements;
increasing a value by a first predetermined number; and
determining if said value is greater than a second predetermined number and responsively clearing an alarm for said one of said elements being open.

23. The method of claim 22 further comprising
setting an alarm for improper sensing of conduction of said one of said elements and said another one of said elements; and
clearing said alarm responsive to both of said sensing conduction of one of said elements and said sensing non-conduction of said another one of said elements.

24. The method of claim 22 further comprising
sensing non-conduction of said one of said elements; and
decrementing said value.

25. The method of claim 22 further comprising
limiting said value to said second predetermined number responsive to said determining if said value is greater than a second predetermined number.

26. The method of claim 11 further comprising
sensing conduction of one of said elements;
employing said one of said elements to convert a first one of said alternating current voltages of a first one of said alternating current phases of a first polarity to said voltage;
employing another one of said elements to convert said first one of said alternating current voltages of said first one of said alternating current phases of an opposite second polarity to said voltage;
sensing conduction of said another one of said elements;
increasing a value by a first predetermined number; and
determining if said value is greater than a second predetermined number and responsively setting an alarm for improper sensing of conduction of said one of said elements and said another one of said elements.

* * * * *